Figure 1:
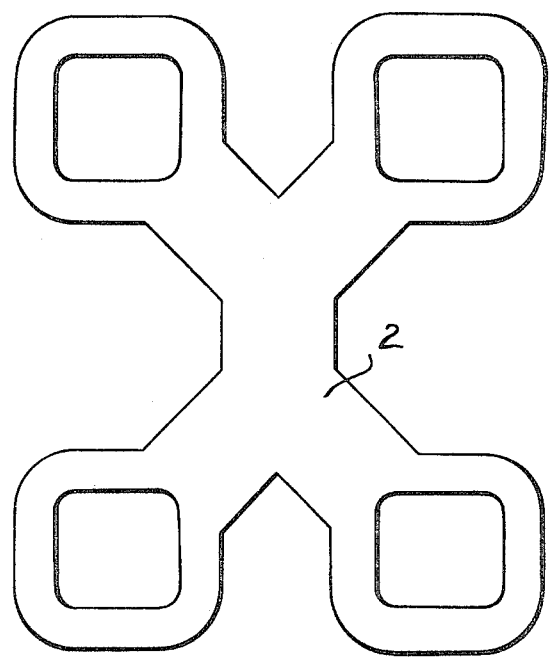

United States Patent [19]
Pampuch et al.

[11] 3,735,571
[45] May 29, 1973

[54] RESPIRATORS

[76] Inventors: Klaus Helmut Georg Pampuch, Wiltinger Str. 1-4, 1 Berlin 28; Werner Herbert Mascher, Bismarckstrasse 6, 1 Berlin 41, both of Germany

[22] Filed: May 25, 1971

[21] Appl. No.: 146,650

[30] Foreign Application Priority Data

June 9, 1970    Germany.....................P 20 29 414.8

[52] U.S. Cl.................55/372, 55/509, 55/DIG. 35, 229/53
[51] Int. Cl. .............................................B01d 31/00
[58] Field of Search........................55/361, 366, 372, 55/378, 379, 385, 509, DIG. 35; 229/66, 53; 150/1

[56] References Cited

UNITED STATES PATENTS

| | | | |
|---|---|---|---|
| 2,030,133 | 2/1936 | Baxter | 55/372 |
| 2,637,918 | 5/1953 | Mayhew | 150/1 |
| 2,708,932 | 5/1955 | Pipher | 55/379 |
| 2,938,597 | 5/1960 | Bolyai | 55/379 |
| 3,137,296 | 6/1964 | Gurtowski | 128/146.6 |

*Primary Examiner*—Bernard Nozick
*Attorney*—Smythe & Moore

[57] ABSTRACT

This invention relates to respirators, of the kind in which a positioning member is located between a filter element and a casing or receptacle. The positioning member is of cruciform shape and its ends form double arms so that the two arms at each said end can embrace a corner of the filter. Preferably, the two arms of each end are connected together by their ends and may form a quadrilateral figure, such as a square.

1 Claim, 2 Drawing Figures

RESPIRATORS

The present invention relates to respirators and particularly to a cruciform positioning member made from flexible material, such as rubber, and used as an insert between the base and the side walls of a filter of a respirator and a casing or receptacle therefor.

In a known respirator, the ends of the cruciform member are formed as a single arm and these ends abut the side walls of the filter in its central region. Since the apparatus consisting of the filter part and the casing or receptacle differ relatively greatly from one another with respect to the distance between the receptacle wall and the filter in the regions where the ends of the cruciform member are located, individual filters are not always firmly seated in their casings or receptacles. The result thereof is that the forces which are required to withdraw the respirators from their casings or receptacles, differ greatly one from the other and the resilient positioning of the filter in the casing or receptacle is not always satisfactory. Moreover, the distance of the cruciform member to the filter part and to the casing or receptacle is not always of the same size in the region of the centre of the areas along the path of the withdrawal, wherefore, when withdrawing the filter from its casing or receptacle, the force required increases towards the ends of the movement. In the known construction, this disadvantage has been somewhat reduced by bevelling the ends of the arms. This bevelling, however, necessitates the additional operation when making the cruciform member. Furthermore, in the known construction, the ends of the filter are free and are, therefore, unprotected upon sudden load which leads to deterioration of the filter material upon impact stress.

The invention has for an object a cruciform member so formed as to remove or minimise the above disadvantages.

According to the invention, the ends of the cruciform member are formed with a double arm and the two arms at each end embrace a corner of the filter therebetween.

Use is made of the fact that the deviations in the nominal distance in the corner area are very much smaller than in the region of the centres of the filter and casing or receptacle. Therefore, the distance between the filter member and the casing or receptacle is also approximately of equal size in the corner area along the path of withdrawal. Moreover, the surfaces and corners of the filter are equally well spring-mounted by a cruciform member according to the invention.

Figure 2:
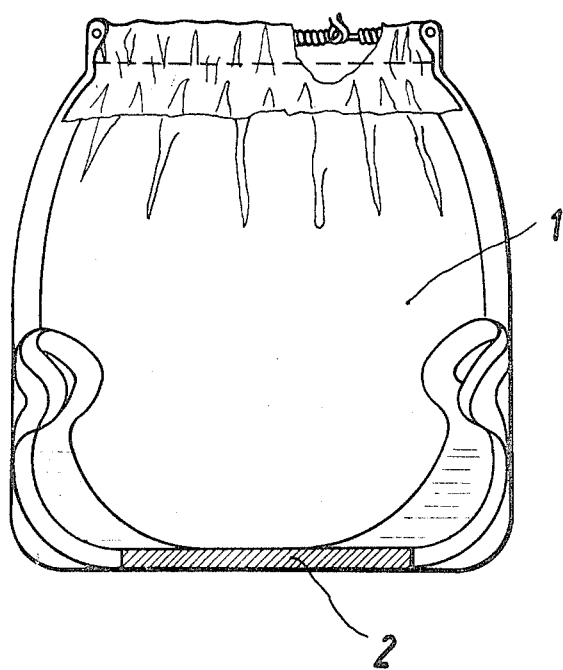

In order that the invention shall be more clearly understood, reference will now be made to the accompanying drawings showing one embodiment thereof by way of example, and in which:

FIG. 1 shows a flexible cruciform positioning member according to the invention, and FIG. 2 shows a coarse dust bag 1 with a member as shown in FIG. 1 positioned therein.

Referring to the drawings, the member 2 of FIG. 1 is positioned within a coarse-dust bag 1 so that its ends shall resiliently embrace the corners of a filter placed therein and keep it in position. The filter is not shown but its position can be inferred from FIG. 2. Also, the casing or receptacle has not been shown, but the bag 1 is located within it.

As will be seen in the drawings, the two arms are interconnected by their ends and may form a quadrilateral figure, particularly a square as shown.

We claim:

1. A dust bag including a member for positioning a filter in a respirator comprising a substantially flat flexible resilient member having a relatively narrow mid portion, pairs of diverging arms on the ends of said portion terminating in upwardly and angularly flexed generally square open frames whereby said member is of generally cruciform quadrilateral configuration for engagement with the corner areas of the filter, said member contacting the base and side walls of the dust bag.

* * * * *